US011878236B2

(12) United States Patent
Verfaillie et al.

(10) Patent No.: US 11,878,236 B2
(45) Date of Patent: *Jan. 23, 2024

(54) STREAMING VIDEO GAME STATISTICS

(71) Applicant: Amazon Technologies, Inc., Seattle, WA (US)

(72) Inventors: David Hendrik Verfaillie, Laguna Beach, CA (US); Christopher Stewart, Mission Viejo, CA (US); Brent Ryan Nash, Redondo Beach, CA (US); Jorge Oseguera, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 83 days.

This patent is subject to a terminal disclaimer.

(21) Appl. No.: 17/198,149

(22) Filed: Mar. 10, 2021

(65) Prior Publication Data
US 2021/0362048 A1 Nov. 25, 2021

Related U.S. Application Data

(63) Continuation of application No. 15/232,930, filed on Aug. 10, 2016, now Pat. No. 10,974,140.

(51) Int. Cl.
*A63F 13/35* (2014.01)
*A63F 13/25* (2014.01)
(Continued)

(52) U.S. Cl.
CPC ............. *A63F 13/35* (2014.09); *A63F 13/25* (2014.09); *A63F 13/32* (2014.09); *A63F 13/335* (2014.09);
(Continued)

(58) Field of Classification Search
CPC .......... A63F 13/12; A63F 13/00; A63F 13/35; A63F 13/32; A63F 13/335; A63F 13/86;
(Continued)

(56) References Cited

U.S. PATENT DOCUMENTS 8,066,572 B1* 11/2011 Timmons ............... H04L 67/131
463/16
8,485,899 B1* 7/2013 Rom ....................... A63F 13/26
463/31
(Continued)

*Primary Examiner* — Malina D. Blaise
(74) *Attorney, Agent, or Firm* — Knobbe, Martens, Olson & Bear, LLP

(57) ABSTRACT

A video game client on a client device may, for example, be operated by a broadcasting game player, and the client device may capture video generated by a video game client and transmit (e.g., stream) the video to one or more spectators. The video game client may include a local server component, such as a hypertext transfer protocol (HTTP) server, which executes locally at the client device. The local server component may be employed to provide statistical information from the video game to a local client component, such as a web interface. The statistical information provided by the local server component may be included in one or more visual display items that are generated by the client device. The visual display items may be included in the video that is captured and transmitted by the client device, thereby potentially providing live streaming statistical information to spectators of the video game.

21 Claims, 8 Drawing Sheets

(51) Int. Cl.
  *A63F 13/86* (2014.01)
  *A63F 13/32* (2014.01)
  *A63F 13/335* (2014.01)

(52) U.S. Cl.
  CPC ........ *A63F 13/86* (2014.09); *A63F 2300/203* (2013.01); *A63F 2300/51* (2013.01)

(58) Field of Classification Search
  CPC . A63F 2300/203; A63F 2300/51; G06F 17/30
  See application file for complete search history.

(56) References Cited

U.S. PATENT DOCUMENTS

| | | | |
|---|---|---|---|
| 9,032,296 B1 | 5/2015 | Jeffs et al. | |
| 10,974,140 B1 | 4/2021 | Verfaillie et al. | |
| 2003/0130040 A1* | 7/2003 | Dripps | A63F 13/355 463/42 |
| 2004/0242306 A1* | 12/2004 | Tarantino | A63F 3/00157 463/16 |
| 2004/0266535 A1* | 12/2004 | Reeves | A63F 13/69 463/42 |
| 2006/0121992 A1* | 6/2006 | Bortnik | A63F 13/35 463/43 |
| 2007/0117617 A1 | 5/2007 | Spanton et al. | |
| 2007/0121534 A1* | 5/2007 | James | H04L 67/75 370/313 |
| 2008/0147422 A1* | 6/2008 | Van Buskirk | G06Q 10/0631 705/7.12 |
| 2009/0147025 A1* | 6/2009 | Grigsby | H04N 21/2187 345/633 |
| 2013/0252737 A1* | 9/2013 | Mescon | A63F 13/42 |
| 2014/0018165 A1* | 1/2014 | Kern | A63F 13/358 463/31 |
| 2014/0243103 A1* | 8/2014 | Rom | A63F 13/798 463/47 |
| 2014/0255881 A1* | 9/2014 | Rom | G09B 19/22 434/118 |
| 2014/0274322 A1* | 9/2014 | McDonald | G07F 17/3258 463/25 |
| 2015/0139610 A1 | 5/2015 | Syed et al. | |
| 2016/0219338 A1 | 7/2016 | Wang et al. | |
| 2016/0359702 A1* | 12/2016 | Besehanic | H04L 67/1001 |
| 2017/0021274 A1* | 1/2017 | Vonderhaar | A63F 13/795 |
| 2017/0282075 A1 | 10/2017 | Michot et al. | |
| 2018/0126285 A1* | 5/2018 | Kehoe | A63F 13/45 |
| 2018/0214777 A1* | 8/2018 | Hingorani | A63F 13/5255 |
| 2019/0295367 A1* | 9/2019 | McDonald | A63F 13/12 |

\* cited by examiner

STREAMING VIDEO GAME STATISTICS

CROSS REFERENCE TO RELATED APPLICATIONS

This application is a continuation of U.S. patent application Ser. No. 15/232,930, now U.S. Pat. No. 10,974,140, entitled "STREAMING VIDEO GAME STATISTICS" and filed Apr. 13, 2016, the disclosure of which is incorporated in its entirety herein by reference.

BACKGROUND

The popularity and widespread appeal of video games has increased dramatically in recent years. The popularity of video games is not limited only to players, as many non-player individuals, sometimes referred to as spectators, often watch live streams of video games that are played by others. In some examples, a game player, sometimes referred to as a broadcaster, employs image capture software on the player's device to capture video of live gameplay and then stream the video to other locations, such as a video game streaming service. The video game streaming service may then, in turn, provide the streaming video to various subscribers for viewing. In some examples, the video captured from the game may be streamed live (e.g., in real time or near-real time) from the game player to the spectators for viewing. While this technology provides a number of advantages, it may also have a number of associated limitations. For example, in some cases, because the video may be captured from a player's device, spectators may be limited to viewing the same information that is provided to the player. However, spectators and players may often be interested in at least partially different information about the game. Additionally, in some cases, conventional video games may provide limited, if any, interfaces for requesting live statistical information, thereby not allowing statistical information to be specifically filtered or customized to different interests, game play styles, preferences, etc. or to be provided in a format that is easily parsed and converted into visual elements.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
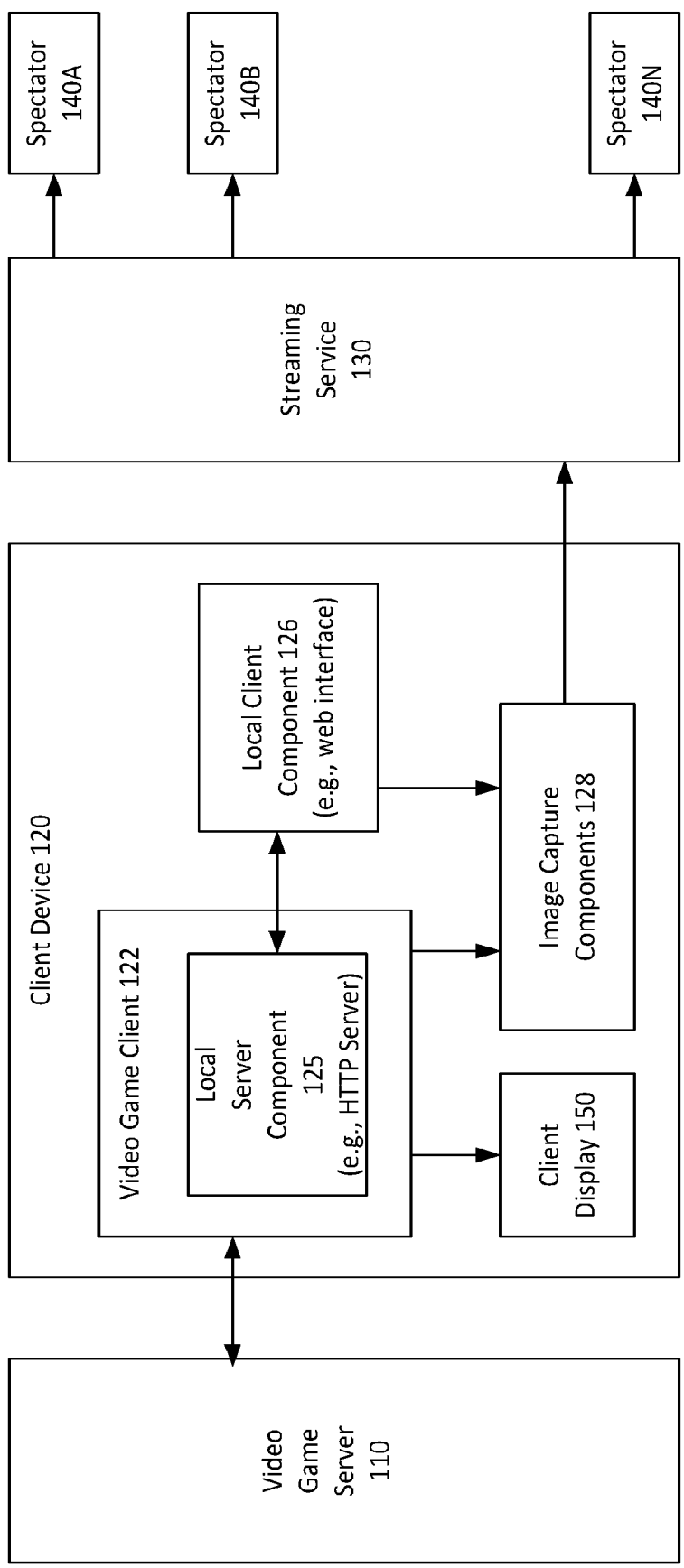
FIG. 1 is a diagram illustrating an example system for streaming video game statistics that may be used in accordance with the present disclosure.

Techniques for providing streaming video game statistics are described herein. In some examples, statistics may be provided for a multi-player video game executed by multiple video game client applications at multiple client devices and one or more video game server applications at one or more remote servers. Also, in some examples, at least a first client device may be operated by a broadcasting game player, and the first client device may capture video generated by a respective first game client and transmit (e.g., stream) the video, for example to a video game streaming service for viewing by one or more spectators. At least the first video game client application may include a local server component, such as a hypertext transfer protocol (HTTP) server, which executes locally at the first client device. The local server component may be employed to provide statistical information from the video game to a local client component, such as a web interface. In some examples, the statistical information provided by the local server component may be included in one or more visual display items (e.g., overlays, side panels, etc.) that are generated by the first client device. The visual display items may be included in the video that is captured and transmitted by the first client device, thereby potentially providing live streaming statistical information to spectators of the video game.

In some cases, the above-described example techniques may provide a number of advantages. For example, inclusion of the local server component in a video game client application may allow requested statistical information to be filtered and customized to different interests, game play styles, and other preferences. In some cases, broadcasting player may select statistics to reflect a current discussion or focus. This may serve to build engagement and also allows viewers to quickly acclimatize to the current state of a broadcast when tuning in halfway, or discovering the game for the first time. Additionally, because the local server component executes within the video game client at the client device, the local server component may provide live statistical information with no detectable latency between game play events and corresponding statistics that reflect those events. Furthermore, in some examples, the use of an HTTP server may allow generation of visual display items by leveraging a wide array of data processing and visualization tools, such as JavaScript, cascading style sheets (CSS), hypertext markup language (HTML) interfaces, and others. For example, in some cases, an HTML page may be generated to control the layout and behavior of each display item that the broadcasting player wishes to use. In some examples, a video game may include one or more standard templates that broadcasters may use, for example with relatively little, if any, editing, to generate display items. These standard templates may optionally be customized, for example using HTML editing tools. The use of these and other tools may allow generation of visual interfaces across multiple different games without forcing game developers to repeatedly have to code instructions for generation of those interfaces into the multiple different games, thereby potentially reducing game development time and production costs.

In some examples, statistical display items may be included in the captured video stream for transmission to spectators but may not be included in the resulting player view that is presented to the broadcasting game player at the first client device. This enables spectators to receive and view potentially large quantities of statistical information, while also allowing the broadcasting player's view of the game to remain uncluttered for effective and responsive game play. For example, a broadcasting player may wish to display certain statistics to spectators that highlight or emphasize particular player accomplishments (e.g., wins, kills, achievements, etc.) that may enhance the player's prestige or build spectator interest but that may not be required by the player for gameplay. Also, in some examples, certain player interfaces (or portions thereof) that are inserted into the broadcasting player's view of the game (e.g., a player head-up display (HUD), status bar, etc.) may not be included in the spectators' view of the game, thereby allowing a player to view statistics that may be needed for gameplay but may not be interesting to spectators and also allowing certain statistics to be observed privately by a player that the player may not wish to share with others.

In some cases, the local server component within the video game client may support a coordinated application programming interface (API) for querying of statistical information. For example, there may be a structured schema that maps uniform resource locators (URLs) to entities, components, and properties in the game state. This structured schema may allow display item elements to easily and efficiently retrieve statistics for the current game state. For example, in some cases, upon receiving a URL associated with a particular entity and/or component, the local server component may employ a handler that maps the URL to the entity and/or component and returns associated statistical information. In some examples, the statistical information provided by the local server component may include images and/or videos, for example depicting players, weapons, inventory, etc. for which statistics are presented. Also, in some examples, the statistical information may include raw statistical data, for example in a format such as JavaScript Object Notation (JSON).

In some examples, instructions for adding and including the local server component, the structured schema for URL mapping, and other features within the video game may be provided by a computing service provider, such as a service provider that hosts and executes the video game on behalf of the developer. For example, the service may provide an API, a software development kit (SDK) and/or other instructions that allow the game developer to easily integrate these and other features within the video game. For example, the service provider may supply a default implementation of the structured schema for mapping URLs to entities. The service provider may also supply handlers for common utility functions, such as searching. Developers may then configure filters for the handlers to restrict the view to whatever they feel is appropriate for their game. Additionally, developers may optionally implement their own handlers that may perform various different customized functions.

In some examples, statistical information may be requested from the local server component using a variety of different techniques. For example, in some cases, at least part of the statistical information may be provided using a subscription model, in which information is continuously and/or repeatedly provided to the local client without having to re-issue a request. Also, in some cases, at least part of the statistical information may be requested periodically by the local client, such as at particular intervals and/or in response to various events. In some examples, it may be advantageous to subscribe to statistics for metrics that change more frequently, such as virtual location, score, health, etc. Also, in some examples, it may be advantageous to issue periodic requests for metrics that change less frequently, such as number of wins, kills, etc. In some examples, a WebSocket connection may be generated between the local server and local client components, for example for streaming of statistical information such as via the subscription model. Also, in some examples, the local server component may listen, for example on a local HTTP port, to answer periodic statistical queries on demand, for example via standard HTTP requests.

FIG. 1 is a diagram illustrating an example system for streaming video game statistics that may be used in accordance with the present disclosure. As shown in FIG. 1, a video game server 110 and a video game client 122 may collectively execute a video game. Video game client 122 executes at client device 120, which may be operated by a video game player. In some examples, the video game may be a multi-player video game that may include any number of additional video game clients (not shown in FIG. 1) in communication with video game server 110. Video game server 110 and video game client 122 may communicate over one or more communications networks, for example one or more local area networks (LANs) or one or more wide area networks (WANs) such as the Internet. In some examples, video gamer server 110 may be executed by a computing services provider that hosts and executes video games on behalf of customers, such as video game developers. It is noted that, while the example of FIG. 1 depicts a video game that is executed collectively by a server and one or more clients, the disclosed techniques may also be applied to video games that are executed entirely on a single device, such as certain single-player video games.

As shown in FIG. 1, video output from video game client 122 may be presented, via client display 150, to the player operating client device 120. Additionally, in the example of FIG. 1, the player operating client device 120 is a video game broadcaster that provides captured images of the video game to spectators 140A-N. Accordingly, in addition to being displayed on client display 150, video output from video game client 122 may also be captured by image capture components 128 executing at client device 120 and transmitted, for example using one or more communications networks such as those described above, to streaming service 130. Streaming service 130 may, in turn, provide the captured video game output, for example using one or more communications networks such as those described above, to spectators 140A-N, which may be subscribers to the streaming service 130. In some examples, the captured video output may be streamed from client device 120 to streaming service 130 and, in turn, to spectators 140A-N using live or real-time streaming transmission techniques, in which images may be viewed by spectators 140A-N almost immediately after the images are captured by image capture components 128.

As also shown in FIG. 1, video game client 122 includes a local server component 125, such as an HTTP server. Local server component 125 may be used to provide video game statistical information to local client component 126. Local client component 126 may be, for example, a web interface. In some examples, the statistical information provided by local server component 125 may include any statistical information associated with the video game executed by server 110 and client 122, such as statistical information associated with entities, components, players, teams, objects, locations, events, time, and other video game attributes. Some example metrics for which statistical information is provided may include current team scores, current player scores, current player health, current player state, current match time, current time remaining, number of players, player class, player names, current player positions, current artifact positions, achievements, player profiles, kill event information (killed player, killing player, skill/weapon), currency earned, damage dealt, damage taken, and many other metrics. In some examples, the provided statistical information may include raw statistical data (e.g., in JSON format), as well as images, graphics, maps, icons, and/or videos, for example representing players, characters, weapons, and other entities. In some cases, broadcasters may select statistics to reflect a current discussion or focus. This may serve to build engagement and also allows viewers to quickly acclimatize to the current state of a broadcast when tuning in halfway, or discovering the game for the first time.

As will be described in detail below, the statistical information provided by local server component 125 to local client component 126 may be included in the captured video that is transmitted by client device 120 to spectators 140A-N via service 130, thereby potentially enhancing the experiences of spectators 140A-N and generating additional interest and prestige for the video game as well as the video game broadcaster. Because the local server component 126 executes within the video game client 122 at the client device 120, the local server component 125 may provide live statistical information with no detectable latency between game play events and corresponding statistics that reflect those events.

Figure 2:
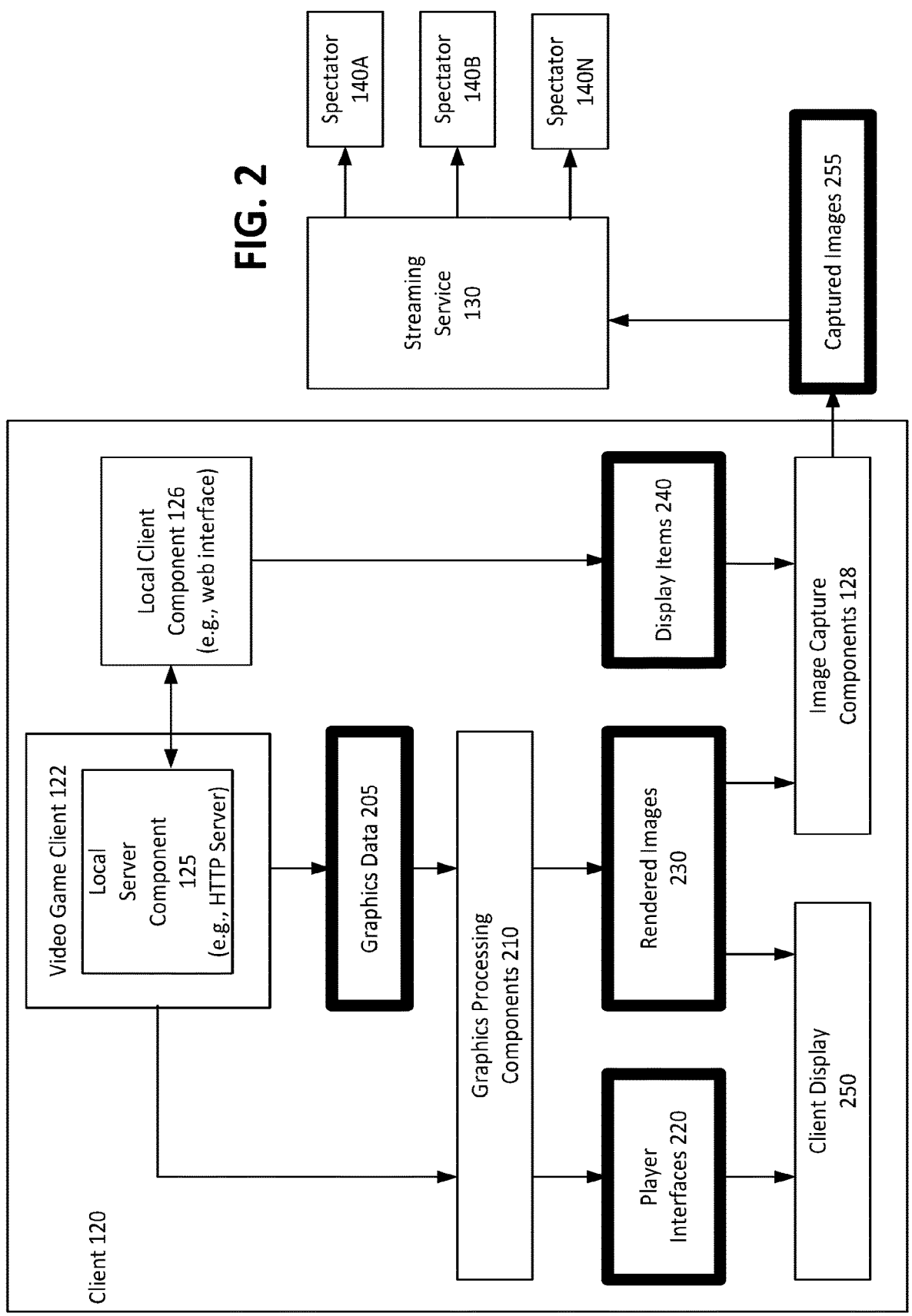
FIG. 2 is a diagram illustrating an example client device component architecture that may be used in accordance with the present disclosure.

Referring now to FIG. 2, an example client device component architecture will now be described in detail. As shown in FIG. 2, video game client 122 may provide graphics data 205 to graphics processing components 210 for generation of rendered images 230. In particular, graphics data 205 may include information about virtual scenes generated by the video game, such as viewpoint location and orientation, object locations, sizes, shapes, colors, textures, shading, lighting, and other information. Graphics processing components 210, such as one or more graphics processing units (GPUs) may use the graphics data 205 to generate rendered images 230 associated with the output of the video game. In some examples, the rendered images 230 may be provided to a client display 250 for displaying of the video game output to the video game player. In addition to rendered images 230, the view of the video game displayed to the player may also include one or more player interfaces 220. Player interfaces 220 may include interfaces such as a player head-up display (HUD), status bar, and other interfaces that provide information to the player that may be useful for game play.

As also shown in FIG. 2, the statistical information provided by local server component 125 to local client component 126 may be used to generate one or more display items 240, such as overlays, side, top, and bottom panels, etc. The rendered images 230 in combination with the display items 240 may then be captured by image capture components 128 to generate captured images 255 for transmission to streaming service 130 and spectators 140A-N. In some examples, the display items 240 may include bars, boxes, or other visual elements that may be positioned at locations that result in minimal (or relatively low) obstruction to the overall image, such as adjacent to edges (e.g., sides, top, bottom), corners, and other similar locations. In some cases, the display items 240 may wholly or partially obstruct (and therefore appear to overlay) portions of the rendered images 230 that are layered underneath (e.g., positioned at the same locations as) the display items 240. Also, in some cases, the display items may not directly overlay rendered images 230 but may instead, for example, be positioned in a side, top and/or bottom panel or area adjacent to the rendered images 230. In some examples, a display item may be fully or partially opaque, translucent, and/or transparent. For example, a display item that is at least partially translucent or transparent may allow portions of rendered images layered beneath the display item to be at least partially visible. Also, in some examples, different portions of a display item may have different respective amounts of opacity, translucency and/or transparency.

As set forth above, in some examples, local server component 125 may be an HTTP server and local client components 126 may include a web interface. As also set forth above, the use of an HTTP server and web interface may allow generation of display items 240 by leveraging a wide array of data processing and visualization tools, such as JavaScript, cascading style sheets (CSS), hypertext markup language (HTML) interfaces, and others. For example, in some cases, an HTML page may be generated to control the layout and behavior of each display item 240 that the broadcasting player wishes to use. The pages may be built using both native HTML elements and custom elements, for example written in JavaScript. In some examples, a video game may include one or more standard templates that broadcasters may use, for example with relatively little, if any, editing, to generate display items. These standard templates may optionally be customized, for example using HTML editing tools. Image capture components 128 may, for example, capture and composite rendered images 230 and display item 240 using a layout definition, for example using chroma key compositing or another compositing technique to render transparency. An employed layout definition may allow the rendered images 230 and display items 240 to be layered, resized, cropped, and transformed as appropriate. In some examples, image capture components may support plugins that embed a web browser than can be rendered and captured in-process, including transparency, and then overlaid into the transmitted video stream.

In some examples, local server component 126 may support a structured schema that maps uniform resource locators (URLs) to entities, components, and properties in the game state. This structured schema may allow display item elements to easily and efficiently retrieve statistics for the current game state. For example, in some cases, upon receiving a URL associated with a particular entity and/or component, the local server component 125 may employ a handler that maps the URL to the entity and/or component and returns associated statistical information. Also, in some examples, upon receiving a URL, the local server component 125 may execute associated script to retrieve a custom data set. In some examples, instructions for adding and including the local server component, the structured schema for URL mapping, and other features within the video game may be provided by a computing service provider, such as a service provider that hosts and executes video game server 110. For example, the service may provide an API, a software development kit (SDK) and/or other instructions that allow the game developer to easily integrate these and other features within the video game. For example, the service provider may supply a default implementation of the structured schema for mapping URLs to entities. The service provider may also supply handlers for common utility functions like searching. Developers may then configure filters for the handlers to restrict the view to whatever they feel is appropriate for their game. Additionally, developers may optionally implement their own handlers that may perform any arbitrary function. In some examples, the computing service provider may provide documentation to game players to describe the general process of retrieving video game statistics and creating display items. Furthermore, in some examples, game developers may provide documentation to game players to describe specific statistical information for their games and how to access it.

The inclusion of the local server component 125 in video game client 122 may allow requested statistical information to be filtered and customized to different interests, game play styles, and other preferences. For example, different players within the same game may request wholly or partially different statistical information. Moreover, the statistical information included in display items 240 and provided to spectators 140A-N may be wholly or partially different than the information included in player interfaces 220 for display to the game player. For example, a broadcasting player may wish to display certain statistics to spectators that highlight or emphasize particular player accomplishments (e.g., wins, kills, achievements, etc.) that may enhance the player's prestige or build spectator interest but that may not be required by the player for gameplay. In the example of FIG. 2, display items 240 are not included in the player view of the video game provided to client display 250. This may be advantageous, in some cases, by allowing spectators 240A-N to view display items 240, while also allowing the broadcasting player's view of the game to remain uncluttered for effective and responsive game play. It is noted, however, that, in some other examples, display items 240 may sometimes be included in the player view of the video game provided to the broadcasting player on client display 250. Additionally, regardless of whether or not display items 240 are included in the broadcasting player's view of the video game, the display items 240 may nevertheless still be displayed to the broadcasting player (e.g., for editing, confirmation, or other purposes) external to the player's game view, for example via a separate portion of a display, separate window, separate monitor, etc. Moreover, in the example of FIG. 2, player interfaces 220 are not included in the video output provided to client display 250. This may be advantageous, in some cases, by allowing a player to view statistics that may be needed for gameplay but may not be interesting to spectators and also allowing certain statistics to be observed privately by a player that the player may not wish to share with others. It is noted, however, that player interfaces 220 may sometimes be included in the images captured by image capture components 128 (or may be rendered over by the display items 240).

Figure 3:
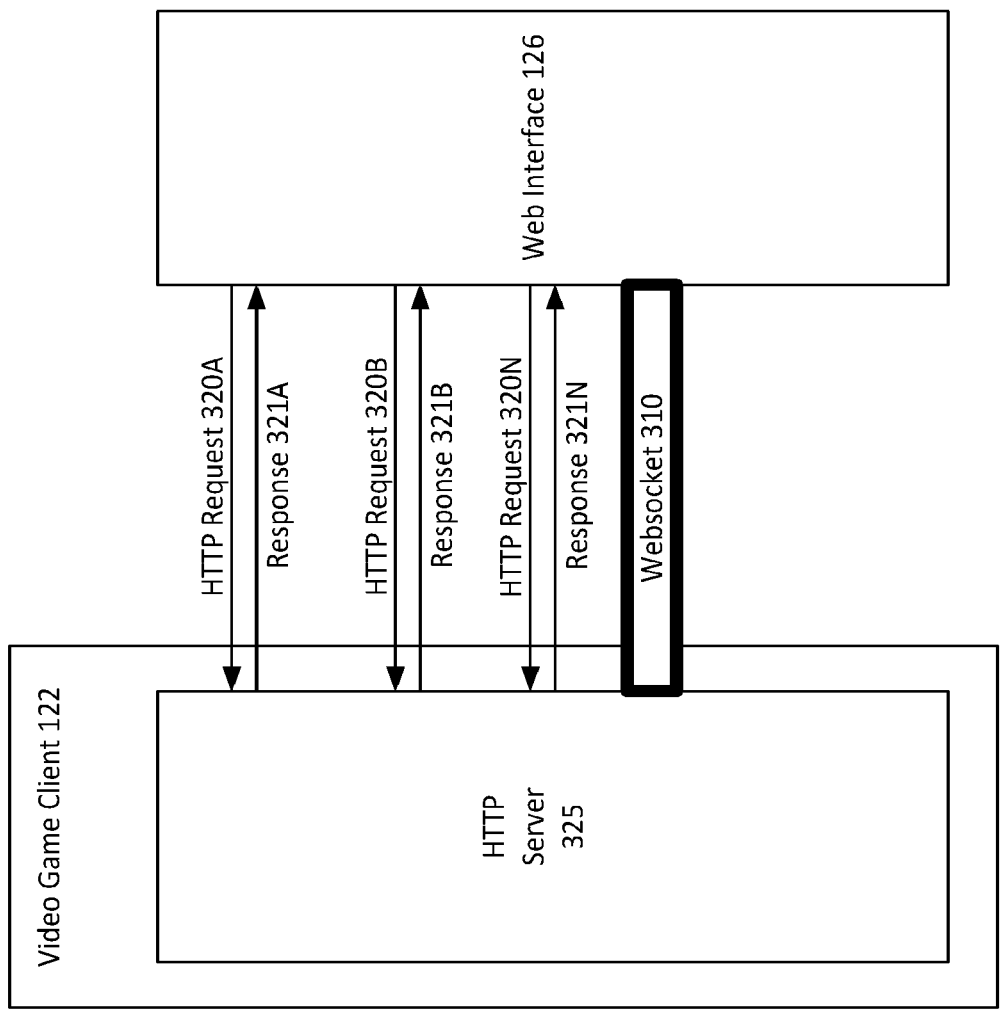
FIG. 3 is diagram illustrating example communications between an HTTP server embedded in a video game client and a web interface that may be used in accordance with the present disclosure.

As set forth above, in some examples, local server component 125 may be an HTTP server embedded in a video game client, and local client component 126 may be a web interface. Referring now to FIG. 3, some example communications between an HTTP server 325 embedded in a video game client 122 and a web interface 326 will now be described in detail. In particular, in the example of FIG. 3, a WebSocket connection 310 is established between HTTP server 325 and web interface 326. The WebSocket connection 310 is a connection established using WebSocket protocol, which may facilitate real-time data transfer between HTTP server 325 and web interface 326. In some examples, web interface 326 may subscribe to receive certain statistical information from HTTP server 325. While subscribed, this information may be continuously and/or repeatedly provided to the local client component without having to re-issue requests for this information. In some examples, statistical information to which web interface 326 has subscribed may be provided using WebSocket connection 310. In some examples, it may be advantageous to subscribe to statistics for metrics that change more frequently, such as virtual location, score, health, etc. As also shown in FIG. 3, in addition to WebSocket connection 310, web interface 326 may also issue any number of HTTP requests 320A-N (having respective responses 321A-N) for certain statistical information. For example, in some cases, HTTP requests 320A-N may be issued periodically by the web interface 326, such as at particular intervals and/or in response to various events. In some examples, it may be advantageous to issue independent HTTP requests 320A-N for metrics that change less frequently, such as number of wins, kills, etc.

Figure 4:
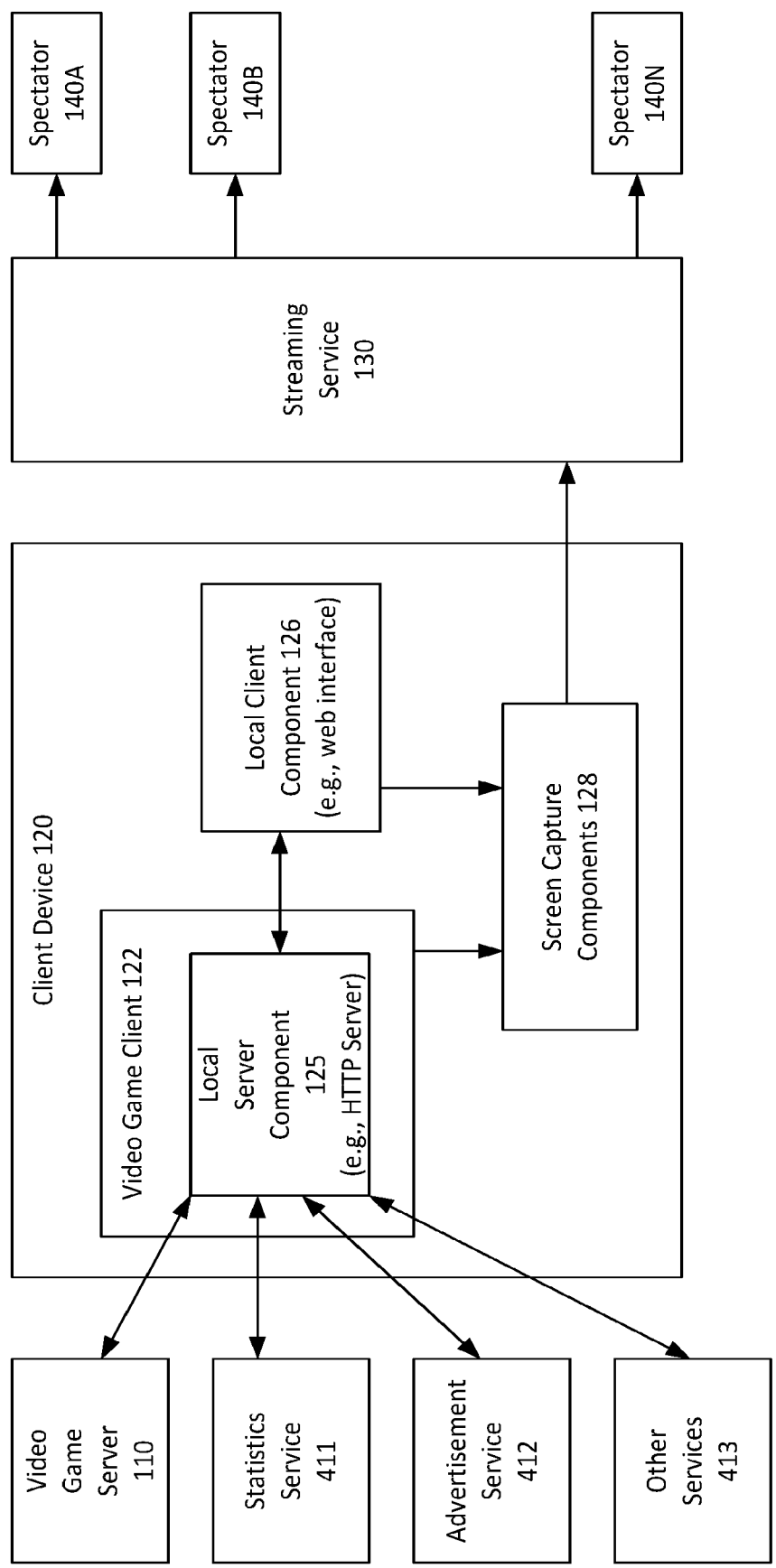
FIG. 4 is a diagram illustrating example services accessible to the local server component that may be used in accordance with the present disclosure.

In some examples, in order to provide additional statistical and other information for inclusion in display items 240, local server component 125 may communicate with one or more other components external to video game client 122 and video game server 110. Referring now to FIG. 4, some examples of additional components with which local server component 125 will now be described in detail. In particular, as shown in the example, of FIG. 4, local server component 125 communicates with video game server 110, statistics service 411, advertisement service 412, and any number of other services 413. In some examples, statistics service 411 may provide enhanced statistical information that may not be readily available from video game server 110. For example, in some cases, statistics service 411 may provide enhanced statistical information such as player win/lose ratios, kill/death ratios, average match length, historical class choice, historical item choice, historical buildable use/destruction, and many other attributes. In one specific example, when the broadcasting player is fighting another player on an enemy team, the broadcasting player may wish to retrieve and stream statistics about the other player that he is fighting and/or about other players on the enemy team. In some examples, it may be desirable to retrieve and stream player statistics not only from the current game, but from a history of prior games in which the players have participated.

In some examples, statistics service 411 may be operated by (or otherwise associated with) a computing service provider that hosts and executes video games on behalf of game developers, and the statistics service may collect, organize, and store statistical information reported by video games executed by the computing service provider. Additionally, in some cases, an API, SDK or other information provided by the computing service provider to video game developers may include instructions that may be embedded or included within the video games for reporting of statistical information to the statistics service 411.

In some examples, advertisement service 412 may provide advertisements, notifications, or other information that may be included within display items 320. In some cases, the provided advertisements may be related to the video game being played, such as advertisements for in-game purchases, advertisements for other associated games or game versions, gaming accessories, and other game related products or features. In some examples, the broadcasting player may receive compensation or other benefits for including advertisements in the captured and streamed video output.

Figure 5:
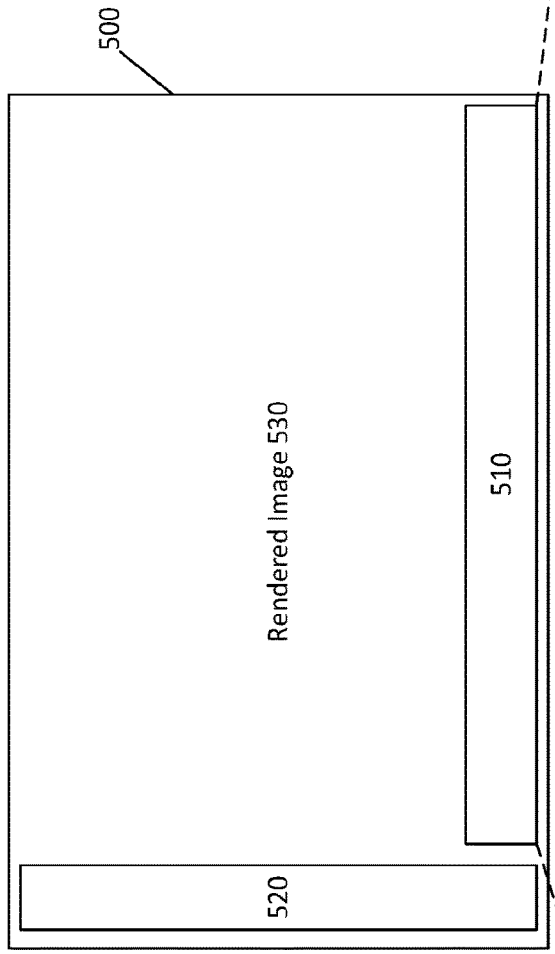
FIG. 5 is a diagram illustrating example statistical information display items that may be used in accordance with the present disclosure.

Referring now to FIG. 5, some example statistical information display items will now be described in detail. In particular, in the example of FIG. 5, a captured image 500 is captured by image capture components 128 for transmission to streaming service 130. The captured image 500 includes a rendered image 530, for example rendered by graphics processing components 210 based on graphics data 205 from video game client 122. Additionally, in captured image 500, portions of rendered image 530 are overlaid by display item 520 on the left side and display item 510 on the bottom. Underneath captured image 500, an enlarged view of display item 510 is depicted. In this example, display item 510 includes statistics for players on the broadcasting player's team (in the MY TEAM column) and statistics for players on an enemy team (in the ENEMY TEAM column). As shown, the broadcasting player's team includes Players A-C, while the enemy team includes Players D-F. Display item 510 displays player images 501A-F each representing a respective one of Players A-F. In some examples, the player images 501A-F may include stored images of the human players, stored images of their respective game characters, or both. Additionally, display item 510 includes health bars 502A-F each indicating a respective health of one of Players A-F. Furthermore, display item 510 displays weapons icons 503-505 indicating weapons possessed by each of Players A-F. In particular, sword icon 503 indicates that a respective player possesses a sword, gun icon 504 indicates that a respective player possesses a gun, and bomb icon 505 indicates that a respective player possesses a bomb. Additionally, display item 510 includes respective numerical statistical values (shown using italics and underlining in FIG. 5) for each of Players A-F for various statistical attributes including kills, deaths, and assists (K/D/A), gold possessed by each player (GOLD), and damage inflicted by each player (DAMAGE).

It is noted that the statistical attributes and presentation formats selected for display item 510 merely non-limiting examples and that display items may include any combination of additional or alternative statistical attributes presented using any combination of additional or alternative presentation formats. For example, in some cases, as opposed to displaying only a single collection of statistics, a display item may periodically cycle through displays of various different statistics, for example using a presentation technique sometimes referred to as a ticker. This may be advantageous, for example, by allowing displays of large quantities of different statistics while reducing the amount of screen space required to display those statistics. It is also noted that, while example display items 510 and 520 are overlays that are layered on top of rendered image 530, there is no requirement that display items must directly overlay a portion of a rendered image. For example, in some cases, display items may not directly overlay rendered images but may instead, for example, be positioned in a side, top and/or bottom panel or area adjacent to the rendered images.

In some examples, the display items may include statistical results in which players or other entities and their respective statistics are ordered or ranked based on statistical values (e.g., high score to low score, most damage dealt to least damage dealt, etc.). Also, in some examples, the display items may include maps, for example corresponding to a virtual area associated with a video game. For example, in some cases, a heat map and/or line/dot graphics may be used to show a path that a ball or other object has traveled over time throughout a virtual area. As another example, a display item may include percentages to indicate relative amounts of time that a ball or other object has been located in various portions of a virtual area. It is further noted that the statistical information included in the display items is not limited to statistical attributes that are directly maintained by the video game itself. For example, in some cases, various statistics may be retrieved from a video game and then aggregated, combined, and adjusted as desired to provide additional statistical information that the video game may not itself directly maintain. Additionally, as described above, statistical information may also be retrieved from other sources external to the video game, such as a statistics service, and used in combination with (or separately from) statistical information retrieved from the video game itself.

Figure 6:
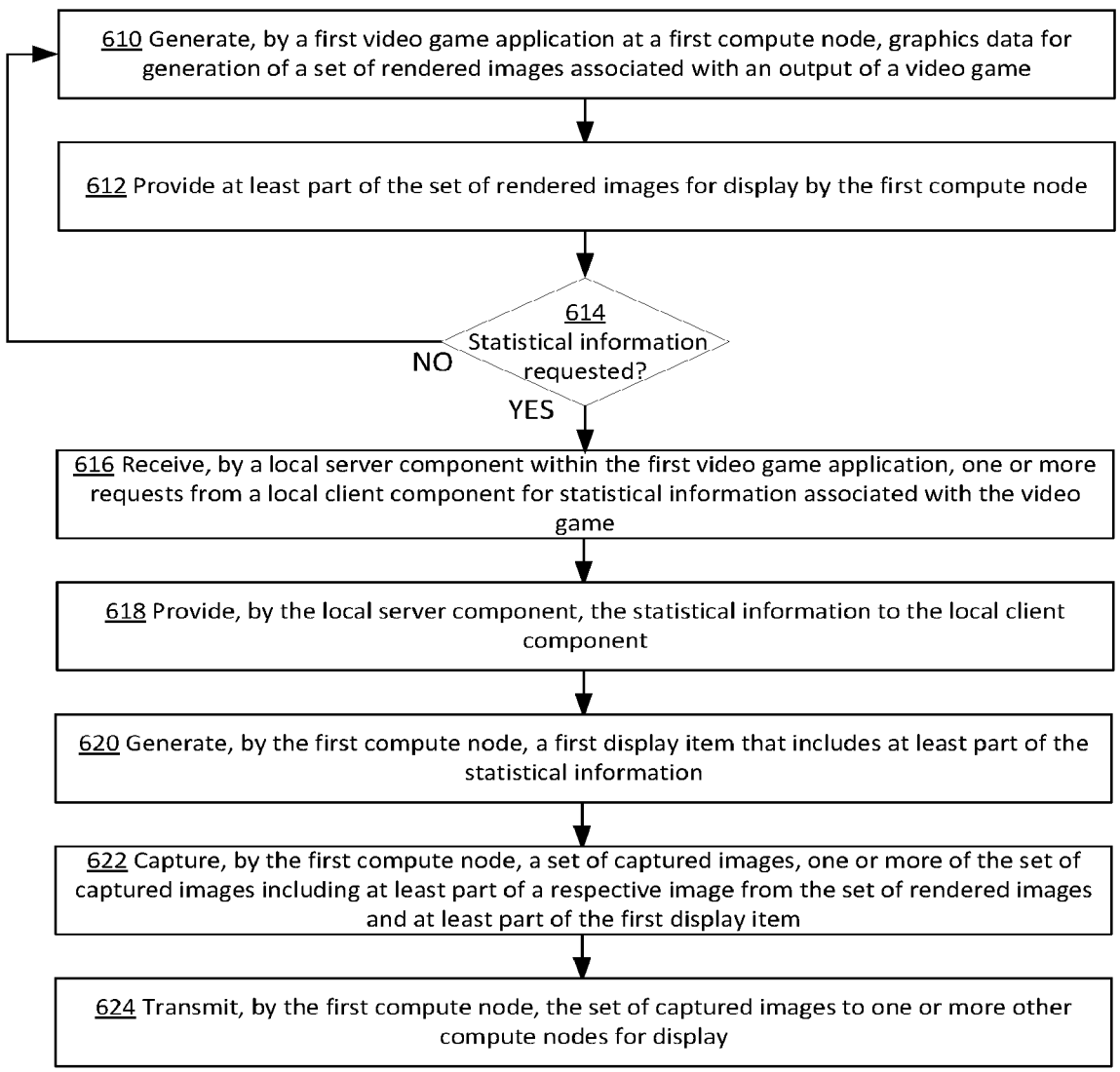
FIG. 6 is a flowchart illustrating an example process for providing video game statistics that may be used in accordance with the present disclosure.

FIG. 6 is a flowchart illustrating an example process for providing video game statistics that may be used in accordance with the present disclosure. As shown, the process of FIG. 6 is initiated at operation 610, at which a first video game application (e.g., video game client 122 of FIG. 1) at a first compute node (e.g., client device 120 of FIG. 1) generates graphics data for generation of a set of rendered images (e.g., rendered images 230 of FIG. 2) associated with an output of a video game. In some examples, the video game may be a multi-player video game, for example executed by a video game server and by a plurality of video game clients including the first video game application. Also, in some examples, the video game may execute entirely at the first compute node, such as in the case of certain single player video games. As set forth above, the graphics data generated at operation 610 may include information about virtual scenes generated by the video game, such as viewpoint location and orientation, object locations, sizes, shapes, colors, textures, shading, lighting, and other information. The graphics data may be provided to graphics processing components, such as one or more graphics processing units (GPUs), for generation of the set of rendered images.

At operation 612, at least part of the set of rendered images are provided for display by the first compute node, for example to a game player that operates the first compute node, using client display 250 of FIGS. 1 and 2. As set forth above, in combination with the set of rendered images, one or more player interfaces (e.g., player interfaces 220 of FIG. 2) may also be displayed to the game player by the first compute node, such as a head-up display (HUD), status bar, and/or other interfaces.

As set forth above, in some examples, the first compute node may be operated by a player of the video game. Also, in some examples, this player may be a broadcasting player that captures and transmits video output from the video game for display to one or more spectators. The techniques described herein may, in some cases, allow such a broadcasting player to request statistical information for inclusion in the video game output that is displayed to these spectators. At operation 614, if statistical information is not requested by the broadcasting player, then the process returns to operation 610. By contrast, when statistical information is requested by the broadcasting player, the process proceeds to operation 616, at which a local server component within the first video game application receives, from a local client component, one or more requests for statistical information associated with the video game. The local client component may execute on the first compute node. As set forth above, in some examples, the local server component may be an HTTP server and the local client component may be a web interface. As also set forth above, in some examples, the local server component may interact with one or more schemas within the video game that map URL's to entities, components, and/or properties within the video game. In some examples, the one or more requests for statistical information received by the local server component may include one or more URL's identifying entities, components, and/or properties for which statistical information is requested. Upon receiving the one or more requests, the local server component may employ a handler that maps the URL's in the requests to entities, components and/or properties within the video game and returns associated statistical information. In some examples, a service provider that hosts execution of the video game (e.g., executes a video game server in communication with the first video game application) may provide an SDK having instructions for including the local server component and/or the one or more schemas within the video game In some examples, one or more of the requests received at operation 616 may be in the form of a subscription, in which information is continuously and/or repeatedly provided to the local client without having to re-issue a request. Also, in some examples, one or more of the requests received at operation 616 may be issued periodically by the local client component, such as at particular intervals and/or in response to various events. In some examples, the requested statistical information may include images, videos, graphics, maps, icons, or other non-purely textual representations. In some examples, at least part of the statistical information may be generated by the video game. Also, in some examples, at least part of the statistical information may be generated by a source external to the video game, such as a statistics service. For example, historical information regarding players, teams, and other attributes may be provided by a statistics service. Furthermore, in some examples, the local server component may provide information received from other sources, such as advertisements from an advertisement service.

At operation 618, the local server component provides, to the local client component, the statistical information requested at operation 616. In some examples, at least a portion of the requested statistical information may be provided using a WebSocket connection between the local server and local client components, for example for streaming of statistical information such as via the subscription model. Also, in some examples, at least a portion of the requested statistical information may be provided via standard HTTP requests, for example for information that is periodically requested by the local client component.

At operation 620, the first compute node generates a first display item that include at least part of the statistical information. In some examples, the first display item may be an overlay, panel, bar, box, and/or other visual element. As set forth above, in some examples, an HTML page may be generated to control the layout and behavior of the first display item. The HTML page may be built using both native HTML elements and custom elements, for example written in JavaScript. In some examples, a video game may include one or more standard templates that may be used, for example with relatively little, if any, editing, to generate display items. These standard templates may optionally be customized, for example using HTML editing tools. In some examples, the first display item may include information generated by one or more sources external to the video game, such as the statistics service and/or advertisement service described above. For example, the first display item may include enhanced statistical information from the statistics service and/or advertisements from the advertisement service.

At operation 622, the first compute node captures a set of captured images (e.g., captured images 255 of FIG. 2). The captured images may include at least part of the rendered images (e.g., rendered images 230 of FIG. 2) associated with the output of the video in combination with one or more display items, such as the first display item generated at operation 620. In particular, one or more of the captured images may include at least part of a respective rendered image in combination with at least part of the first display item. For example, the first display item may be an overlay that is layered on top of one or more rendered images. The first display item may be positioned at locations of the rendered image that result in relatively low obstruction or clutter, such as adjacent to edges, corners, and other similar locations. As set forth above, the captured images may be captured by image capture components 128 executing at the first compute node. In some examples, the image capture components may capture and composite a rendered image and the first display item using a layout definition, for example using chroma key compositing or another compositing technique. An employed layout definition may allow the rendered image and the first display item to be layered, resized, cropped, and transformed as appropriate. As set forth above, in some examples, to reduce clutter and allow for efficient game play, the first display item may not be displayed by the first compute node in a player view of the video game. However, even when the first display item is not displayed in the player view of the video game, the first display item may still be displayed by the first compute node externally to the player view of the video game, for example via a separate portion of a display, a separate window, a separate monitor, etc., such as for editing, confirmation, or other purposes.

At operation 624, the set of captured images is transmitted, by the first compute node, to one or more other compute nodes for display. For example, the captured images may be transmitted to a video game streaming service, which may, in turn, transmit the captured images to one or more spectators for display to the one or more spectators. In some examples, the set of captured images may be streamed from the first compute node to the streaming service and, in turn, to the spectators using live or real-time streaming transmission techniques, in which images may be viewed by spectators almost immediately after the images are captured by the image capture components at the first compute node. It is further noted that the inclusion of the local server component in the first video game application at the first compute node may allow the statistical information to be provided and streamed in real time, for example with no detectable latency between game play events and corresponding statistics that reflect those events. For example, the statistical information associated with the video game may include real-time statistical values that represent a current video game state associated with a rendered image that the real-time statistical values are overlaid upon.

It is noted that, while the above description includes examples in which statistical information display items are generated at the broadcasting player's device, the techniques described herein are not limited to such examples. In particular, in some examples, statistical information may be transmitted by the broadcasting player's device to one or more spectators (e.g., via a streaming service), and the spectators may then generate one or more display items based on the received statistical information. Specifically, in some cases, the broadcasting player's device may obtain statistical information using a local server component (e.g., HTTP server) using techniques such as those described above. The broadcasting player's device may also capture rendered video game images. However, in this scenario, the statistical information display items may not be included in the captured and transmitted images. Rather, the broadcasting player's device may instead transmit two separate streams including a first stream with rendered video game images and a second stream with the retrieved statistical information. These two streams may be encoded and transmitted separately to the streaming service and/or spectators. In some examples, upon receiving these separate streams, a spectator may use the statistical information to generate the statistical information display items, for example using techniques such as those described above. The generated display items may then be layered on top of (or otherwise combined with) one or more of the rendered images received in the separate rendered image stream, and the resulting images with display items may then be displayed to the spectators.

In some examples, because the statistical information and the rendered images may be transmitted using separate streams, there may be latency between the received statistical information and the image frames with which the statistical information is associated. Thus, in some examples, it may be advantageous for the broadcasting player to add timestamps to transmitted portions (e.g., frames) of the rendered image and corresponding statistical information streams, in order to allow the spectators to properly match received statistical information and the image frames with which the statistical information is associated. It is noted that the above described techniques for spectator display item generation may, in some examples, be advantageous, for example by providing spectators with greater control over the content, format, and other features of the generated display items. Also, in some examples, display items may be generated by an intermediate entity, such as the streaming service, before being provided to the spectators. It is further noted that, in any of the techniques set forth above, spectators, the streaming service, and/or other entities may communicate with the broadcasting player, for example using chat, email or other communications mediums, to request that the broadcasting player provide certain statistics, display items, formats, and/or any other requested information or data.

Figure 7:
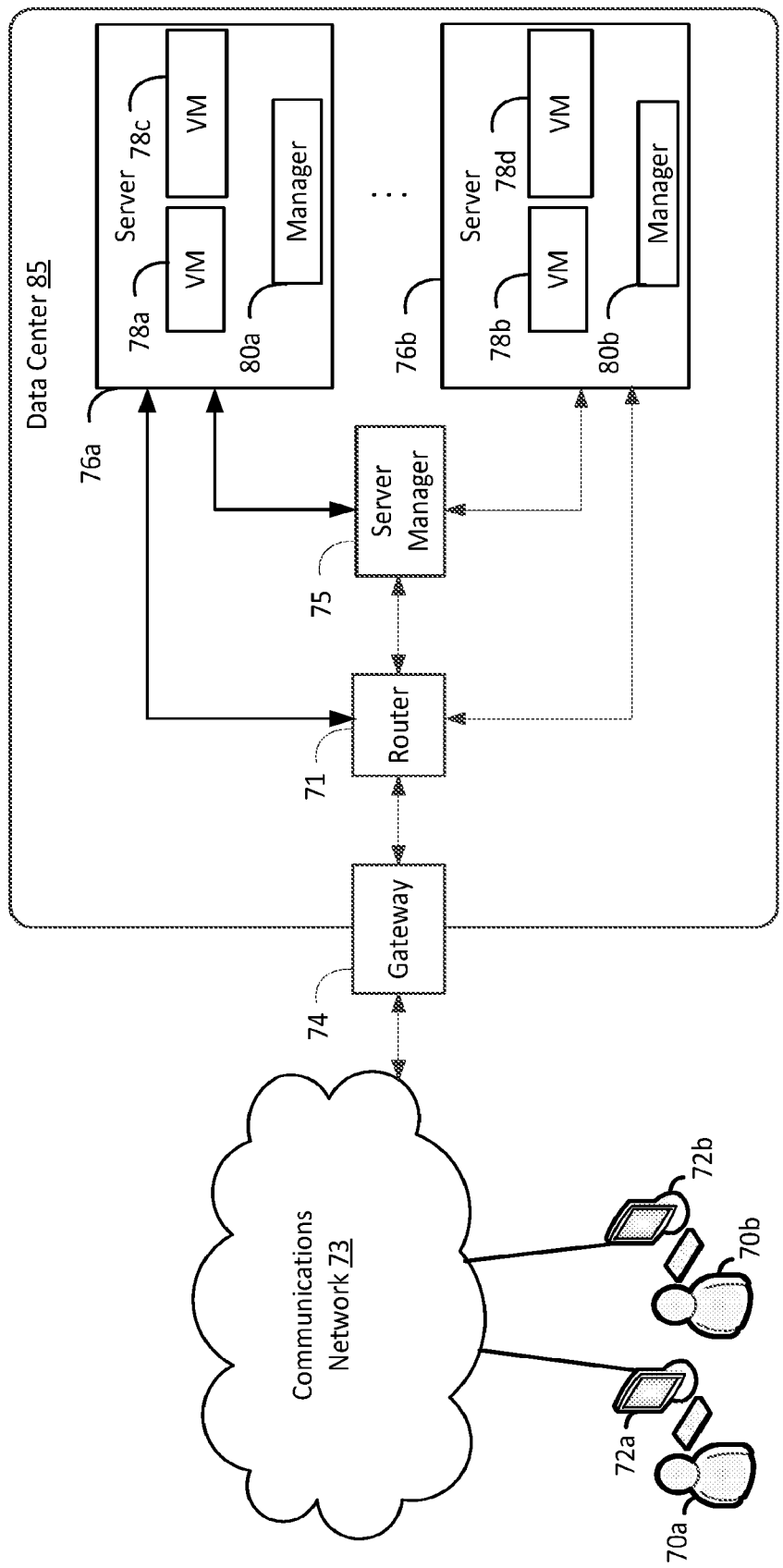
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
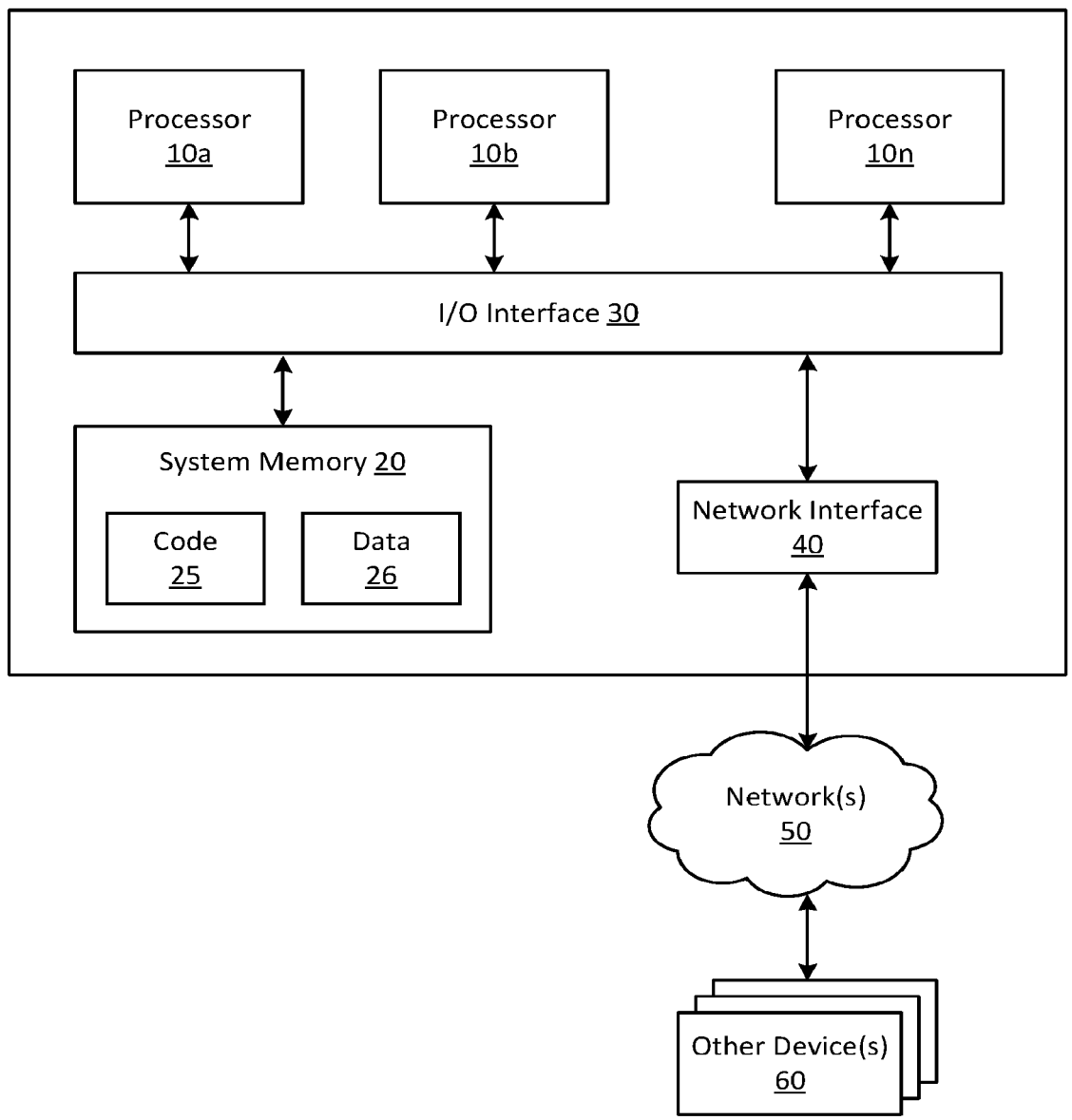
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A player computing system for providing information associated with a video game, the player computing system comprising:
a memory configured to store specific computer-executable instructions; and
a processor in communication with the memory, wherein the processor is configured to execute the specific computer-executable instructions to at least:
execute, at the player computing system, a local client that interfaces with a local server via a streaming connection internal to the player computing system;
execute, at the player computing system, a video game application for the video game that includes the local server configured to execute within the video game application, wherein:
the local server, while executing within the video game application:
receives from the local client, a request for statistical information associated with the video game, and
provides the statistical information associated with the video game to the local client via the streaming connection internal to the player computing system,
generate a display item that includes at least part of the statistical information associated with the video game, wherein the at least part of the statistical information included in the display item includes a real-time statistical value that represents a current state of the video game;
capture a set of captured images, wherein the set of captured images includes a first rendered image associated with an output of the video game and the display item, and wherein the first rendered image is an image of the current state of the video game and is associated with the real-time statistical value; and
transmit to another computing device the set of captured images for presentation by the other computing device via an external network distinct from the streaming connection internal to the player computing system.

2. The player computing system of claim 1, wherein the local server configured to execute within the video game application interacts with at least part of a default schema that maps a uniform resource locator (URL) to at least one of an entity, a component, or a property associated with the video game.

3. The player computing system of claim 1, further comprising a display for presenting rendered images associated with the output of the video game, wherein the first rendered image is included in the rendered images and the processor is configured to execute further specific computer-executable instructions to at least provide a part of the rendered images to the display for presentation.

4. A computer-implemented method for providing information associated with a video game, the computer-implemented method comprising:
causing execution, at a player computing device, of a local client that interfaces with a local server via a streaming connection internal to the player computing device;
causing execution, at the player computing device, of a video game application, for the video game, wherein the video game application includes the local server, wherein during execution of the video game application:
the local server receives from the local client a request for statistical information associated with the video game, and
the local server provides the statistical information associated with the video game to the local client via the streaming connection internal to the player computing device;
generating, at the player computing device, a display item that includes at least part of the statistical information associated with the video game, wherein the at least part of the statistical information included in the display item includes a real-time statistical value that represents a current state of the video game;
capturing, at the player computing device, a set of captured images, wherein the set of captured images includes a first rendered image associated with an output of the video game and the display item, and wherein the first rendered image is an image of the current state of the video game and is associated with the real-time statistical value; and
transmitting, by the player computing device, the set of captured images for presentation to another computing device via an external network distinct from the streaming connection internal to the player computing device.

5. The computer-implemented method of claim 4, wherein the streaming connection internal to the player computing device comprises an HTTP connection.

6. The computer-implemented method of claim 4, wherein the video game is a multi-player video game executed by a video game server and by a plurality of video game clients, and wherein the video game application is executed by at least one video game client of the plurality of video game clients.

7. The computer-implemented method of claim 4, wherein the streaming connection internal to the player computing device comprises a WebSocket connection.

8. The computer-implemented method of claim 4, wherein a statistics service external to the video game provides to the local server a statistic about a player operating another player computing device.

9. The computer-implemented method of claim 4, wherein the display item includes information generated by a source external to the video game, and wherein the source comprises at least one of a statistics service or a third party content service.

10. The computer-implemented method of claim 4, wherein additional content from a third party service is selectively included in the set of captured images by a player operating the player computing device.

11. The computer-implemented method of claim 4, wherein the local server interacts with at least part of a schema that maps a uniform resource locator (URL) to at least one of an entity, a component, or a property associated with the video game.

12. The computer-implemented method of claim 11, wherein the schema is provided to the local server via an application programming interface.

13. The computer-implemented method of claim 4, wherein the local server provides, via the streaming connection internal to the player computing device, the statistical information associated with the video game to the local client with substantially no detectable latency between a game play event and statistics corresponding to the game play event.

14. The computer-implemented method of claim 4, further comprising generating, at the player computing device, a player interface that includes player statistical information that is observed by a player operating the computing device.

15. The computer-implemented method of claim 4, wherein the first rendered image and the display item are encoded and transmitted separately to the other computing device via the external network for presentation.

16. The computer-implemented method of claim 14, wherein a timestamp is added to at least the first image of the set of captured images for matching the first rendered image to corresponding statistical information included in the display item.

17. The computer-implemented method of claim 4, wherein the display item and the first rendered image are at least one of layered, resized, cropped, or transformed for presentation based at least in part on a layout definition.

18. A non-transitory computer-readable storage medium having stored thereon instructions that, upon execution by a player computing device, cause the player computing device to perform operations comprising:
  executing a video game application, wherein the video game application includes a local server, and wherein as the video game application executes:
    the local server included in the video game application receives a request from a local client for statistical information associated with the video game,
    the local server included in the video game application provides the statistical information associated with the video game to the local client via a streaming connection internal to the player computing device;
  generating a display item that includes at least part of the statistical information associated with the video game, wherein the at least part of the statistical information included in the display item includes a real-time statistical value that represents a current state of the video game;
  capturing a set of captured images, wherein the set of captured images includes a first rendered image associated with an output of the video game and the display item, and wherein the first rendered image is an image of the current state of the video game and is associated with the real-time statistical value; and
  transmitting the set of captured images to another computing device for presentation via an external network distinct from the streaming connection internal to the player computing device.

19. The non-transitory computer-readable storage medium of claim 18, wherein the display item is displayed by the player computing device externally to a player view of the video game.

20. The non-transitory computer-readable storage medium of claim 18, wherein at least one of a statistical attribute of the display item or a presentation format of the display item is selected for generating the display item.

21. The non-transitory computer-readable storage medium of claim 18, wherein the statistical information associated with the video game includes at least one of an image, a video, a graphic, a map or an icon.

* * * * *